(12) United States Patent
Ao

(10) Patent No.: US 6,587,610 B2
(45) Date of Patent: Jul. 1, 2003

(54) SEGMENTED OPTICAL SWITCH

(75) Inventor: Eric Rong Ao, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 145 days.

(21) Appl. No.: 09/769,368

(22) Filed: Jan. 26, 2001

(65) Prior Publication Data

US 2002/0102045 A1 Aug. 1, 2002

(51) Int. Cl.[7] .............................................. G02B 6/35
(52) U.S. Cl. ...................................... 385/17; 359/115
(58) Field of Search ..................... 385/16–24; 359/115, 359/124–134

(56) References Cited

U.S. PATENT DOCUMENTS

| | | | | |
|---|---|---|---|---|
| 4,580,873 A | * | 4/1986 | Levinson ..................... | 385/17 |
| 5,841,917 A | * | 11/1998 | Jungerman et al. ........... | 385/15 |
| 5,982,554 A | * | 11/1999 | Goldstein et al. ........... | 359/618 |
| 6,144,781 A | * | 11/2000 | Goldstein et al. ............ | 385/18 |
| 6,411,752 B1 | * | 6/2002 | Little et al. .................. | 385/17 |
| 6,445,840 B1 | * | 9/2002 | Fernandez et al. ............ | 385/17 |
| 6,445,841 B1 | * | 9/2002 | Gloeckner et al. ............ | 385/17 |
| 6,453,083 B1 | * | 9/2002 | Husain et al. ................ | 385/17 |
| 6,459,828 B1 | * | 10/2002 | Andersen ..................... | 385/17 |

* cited by examiner

Primary Examiner—Akm E. Ullah
Assistant Examiner—Michelle R. Connelly-Cushwa
(74) Attorney, Agent, or Firm—Neil Teitelbaum

(57) ABSTRACT

In an effort to greatly decrease the insertion losses inherent in larger sized M×N optical switches, the present invention deals with minimizing the variation in the optical path lengths of optical beams passing through the switch. To accomplish this goal, the present invention relates to a segmented optical switch comprising four segments, two segments having input ports and two segments having output ports. The segments having output ports are separated from each other, and positioned on adjacent sides of the segments with input ports. Accordingly, the very short optical paths as well as the very long optical paths in the switch are eliminated, thereby minimizing the variation in the optical path lengths. Preferably, the switch is comprised of four identical segments, making manufacturing and supply costs less.

10 Claims, 4 Drawing Sheets

SEGMENTED OPTICAL SWITCH

The present invention relates to an optical switch, and in particular to a segmented M×N optical switch.

BACKGROUND OF THE INVENTION

In the fiber optics industry M×N optical switches are used to selectively optically couple one of a plurality of input optical fibers with one of a plurality of output optical fibers. U.S. Pat. No. 4,580,873, issued Apr. 8, 1986 to Frank Levinson, discloses a basic M×N optical switch having an array of input lenses along one side and an array of output lenses along another side.

As the demand for the transmission of greater amounts of information grows, so does the number of optical fibers, and so does the size of the switches, which are required to direct the beams of light carrying the information. However, there are definite physical limits within which the design of a switch must adhere. Basic economics dictate that the switch should be as small as possible to minimize material costs, but there are several other interrelated factors that play a role in the design of a switch. These factors include lens characteristics, mirror size, and optical path length. A Gaussian beam launched through an appropriate lens initially converges and subsequently diverges. The minimum beam diameter is called the waste, the position and size of which are based on the parameters of the lens and the beam. The position of the waist is important since the beam diameter increases thereafter, and it is the diameter of the beam that dictates the size of the mirrors and the maximum optical path length to ensure good optical coupling. When all of the lenses have the same focal length, insertion loss is minimized by making the distance from the collimating lens to the reflecting mirror the same as the distance from the reflecting mirror to the focusing lens, and by focussing the beam waist on the reflecting mirror. Obviously, this is impossible for every combination of input and output lens. Accordingly, to minimize the variation in insertion loss, it is important to minimize the variation in the optical path lengths and to position the beam waist at the average optical path length. However, in the conventional matrix switch, the optical path length from the first input port to the first output port is short, while the optical path length from the last input port to the last output port is much longer. Therefore, when conventional switches are used with a large number of input/output ports the variation in optical path lengths is very large, resulting in a large variation in insertion loss.

A previous attempt to equalize all of the path lengths is disclosed in U.S. Pat. No. 5,841,917, issued Nov. 24, 1998 to Jungerman, Roger L. et al. Unfortunately, the arrangement disclosed in the Jungerman et al patent is quite bulky and cumbersome, particularly as the number of input/output ports increases.

An object of the present invention is to overcome the shortcomings of the prior art by providing an optical switch with a minimum insertion loss variation by minimizing the variation in optical path lengths.

SUMMARY OF THE INVENTION

Accordingly, the present invention relates to a segmented optical switch comprising:
a first segment including P input ports for launching beams of light into the switch;
a second segment, adjacent the first segment, including X output ports for receiving beams of light from the switch;
a third segment, adjacent the second segment, including Q input ports for launching beams of light into the switch; and
a fourth segment, adjacent the first and third segments, including Y output ports for receiving beams of light from the switch;
wherein the first segment also includes P×Y reflecting means for redirecting the beams of light from the P input ports to the Y output ports;
wherein the second segment also includes P×X reflecting means for redirecting the beams of light from the P input ports to the X output ports;
wherein the third segment also includes Q×X reflecting means for redirecting the beams of light from the Q input ports to the X output ports; and
wherein the fourth segment also includes Q×Y reflecting means for redirecting the beams of light from the Q input ports to the Y output ports.

BRIEF DESCRIPTION OF THE DRAWINGS

The present invention will be described in greater detail with reference to the accompanying drawings which illustrate a preferred embodiment of the invention and wherein.

DETAILED DESCRIPTION

Figure 1:
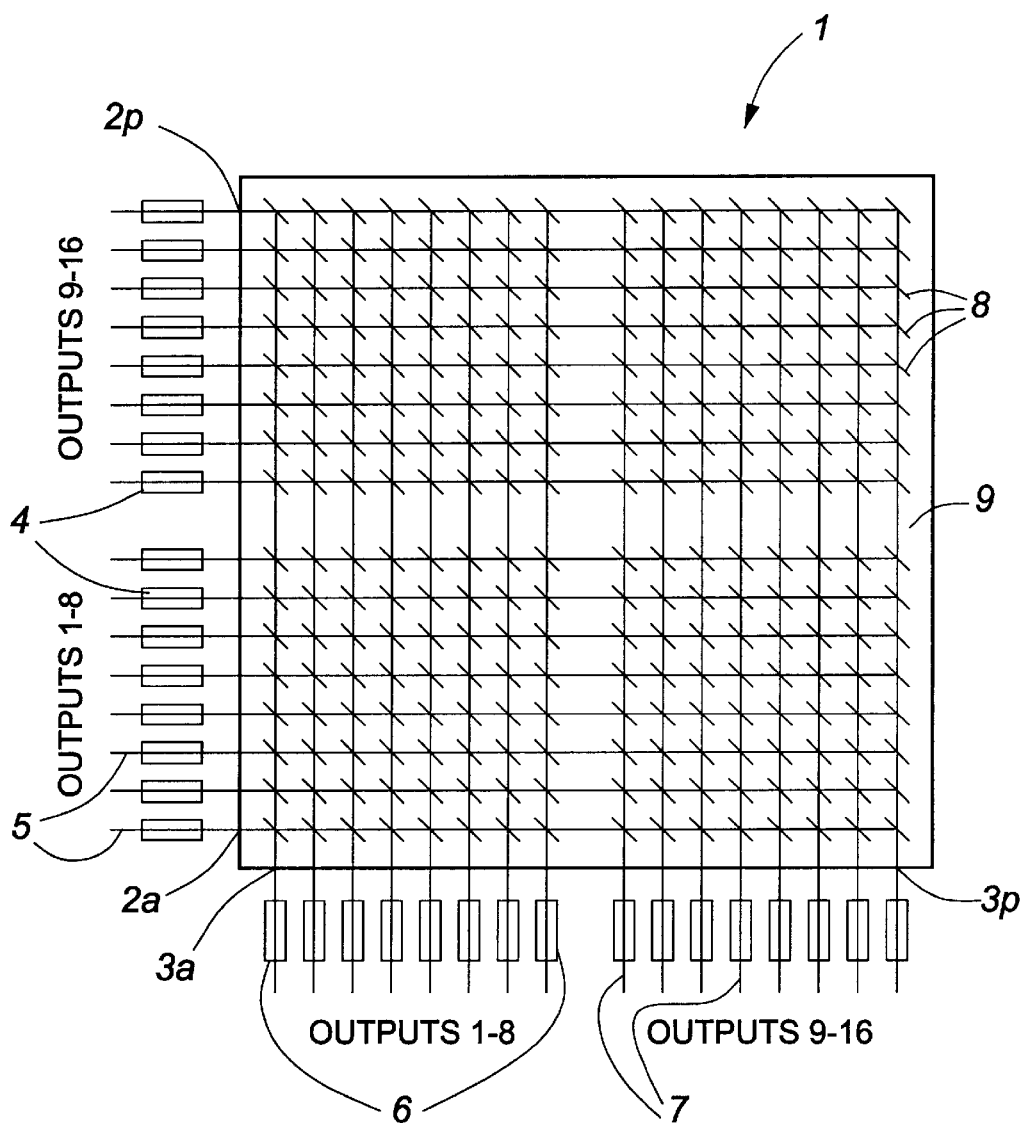
FIG. 1 is a schematic plan view of a convention 16×16 optical switch.
Figure 3:
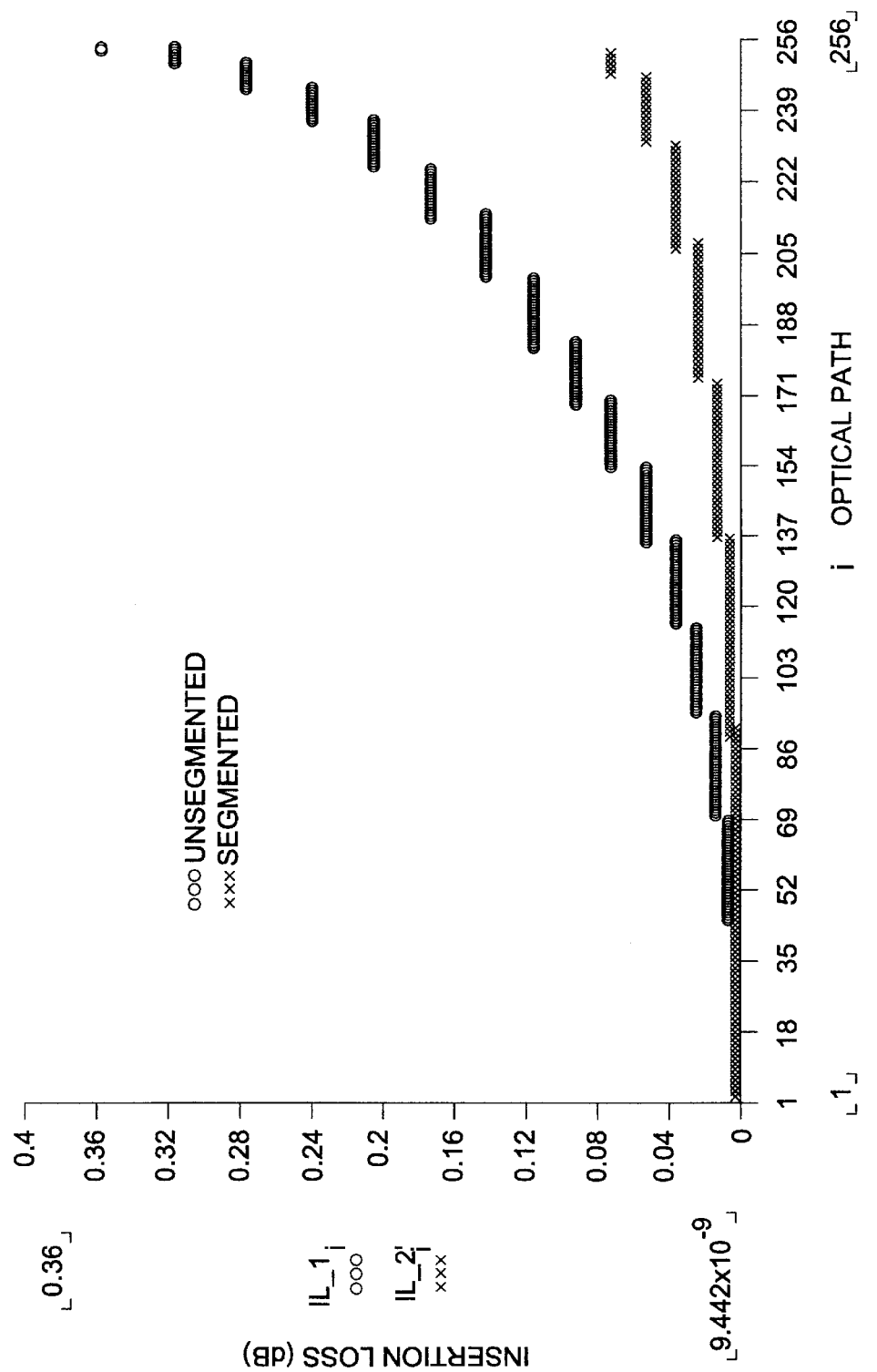
FIG. 3 is a plot of the insertion loss for the various input/output port combinations for a conventional 16×16 switch and for the segmented 16×16 optical switch according to the present invention.

FIG. 1 illustrates a conventional 16×16 optical switch 1 including sixteen input ports 2a to 2p, and sixteen output ports 3a to 3p. Each input port 2a to 2p includes a collimating lens 4 receiving input fibers 5, and each output port 3a to 3p includes a focusing lens 6 receiving output fibers 7. The switch 1 also includes a 16×16 array of reflective mirrors 8, aligned between the input ports 2a to 2p and the output ports 3a to 3p. The mirrors 8 are mounted on a substrate 9 and selectively positioned in the path of an input beam of light to direct the beam at any one the output ports 3a to 3p. In the illustrated example, the optical path length from input port 2a to output port 3a would be very short, while the optical path length from input port 2p to output port 3p is much longer. Accordingly, the insertion loss would be large for both of these examples, if the lenses 4 and 6 are designed for the average optical path length defined by input port 2i to output port 2i. The plot for the unsegmented switch in FIG. 3 illustrates the variation in the insertion losses, between the various path lengths in a conventional switch.

Figure 2:
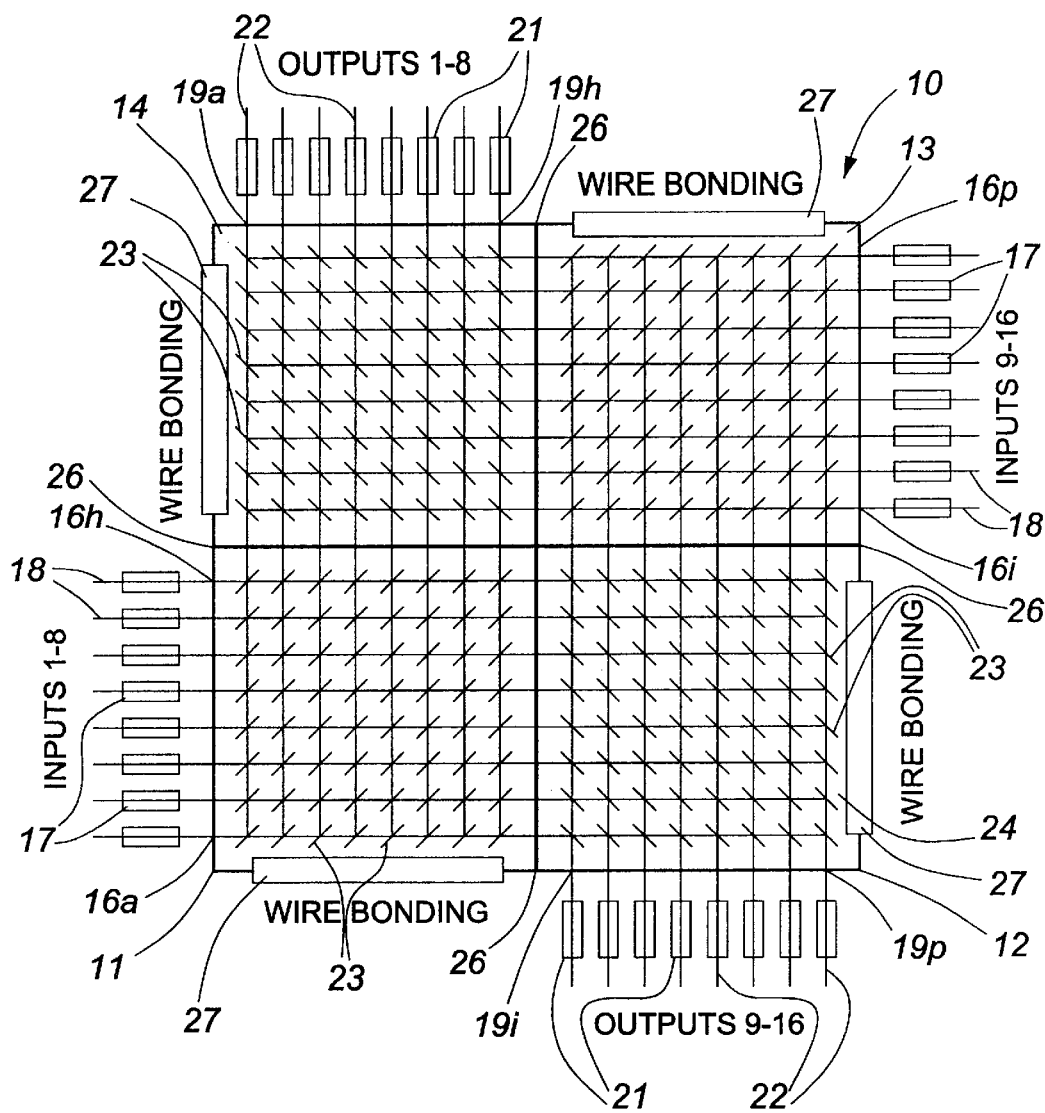
FIG. 2 is a schematic plan view of a segmented 16×16 optical switch according to the present invention.

The large variation in the insertion loss is eliminated by the use of a switch designed according to the present invention, an embodiment of which is illustrated in FIG. 2. The illustrated switch, generally indicated at 10, includes four segments 11, 12, 13 and 14. The first and third segments 11 and 13, respectively, include input ports 16a to 16p. The first and third segments 11 and 13, respectively, can include any number of ports, although it is preferable that the first segment 11 includes the same number of ports as the third segment 13, i.e. the input ports are equally divided between the two segments. Each input port 16a to 16p includes a collimating lens 17 receiving an input optical fiber 18. The second and fourth segments 12 and 14, respectively, include output ports 19a to 19p. The second and fourth segments 12 and 14, respectively, can include any number of ports, although it is preferable that the ports 19 be equally distributed between the two segments 12 and 14. Each output port 19a to 19p includes a focusing lens 21, which receives an output optical fiber 22. Preferably, both the collimating lenses 17 and the focusing lenses 21 are approximately ¼ pitch graded index (GRIN) lenses.

For the sake of convenience, the ports 16a to 16p are referred to as input ports and the lenses 17 are referred to as collimating lenses, while ports 19a to 19p are referred to as output ports and the lenses 21 are referred to as focusing lenses. In practice, ports 16a to 16p and 19a to 19p can be used as both input and output ports, i.e. lenses 17 an 21 can be used as both collimating and focusing lenses.

Each segment 11 to 14 includes an 8×8 array of reflecting mirrors 23. Preferably, the mirrors 23 are pivotally mounted on a microelectronic substrate 24 using a micro-electromechanical-type system (MEMS). However, any form of mirror system is acceptable, e.g. rotateably, horizontally or vertically moveable. It is possible to construct the entire switch using a single microelectronic substrate, however, due to the segmented nature of the switch, it is also possible to construct each segment separately. The individual segments could then be fixed together along connection lines 26. In the example illustrated in FIG. 2, the switch 1 is constructed out of four identical segments. This would greatly decrease manufacturing costs, since it is much easier and cheaper to construct several identical segments rather than segments with various sizes or one large substrate. Each segment 11 to 14 also includes a wire bonding 27 for connecting power to the various mirrors 23.

In use, the mirrors 23 of the first segment 11 are used to redirect the optical signals, entering input ports 16a to 16h, bound for output ports 19a to 19h. Optical signals entering input ports 16a to 16h destined for output ports 19i to 19p are redirected using the mirrors 23 of the second segment 12, while the appropriate mirrors on the first segment 11 are positioned out of the optical path thereof. Similarly, mirrors 23 on the third segment 13 redirect optical signals entering input ports 16i to 16p, bound for output ports 19i to 19p. Furthermore, mirrors 23 of the fourth segment 14 redirect optical signals launched through input ports 16i to 16p destined for output ports 19a to 19h.

The arrangement according to the present invention limits the variation in insertion loss by narrowing the range of possible optical path lengths. For example, in the switch 10, the shortest optical path length would be from input port 16h to output port 19a, while the longest optical path length would be from input port 16a to output port 19h. Assuming that all of the lenses 17 and 21 are the same, the variance in optical path lengths would be similar to that of a switch having half the number of inputs and outputs.

To further minimize the insertion losses, the lenses 17 are selected so that they focus the waists of the input beams at a mid-way point of the average optical path length, i.e. the lenses 17 of segment 11 focus the waists on the connection line 26 between first and second segments 11 and 12, respectively, and the lenses 17 of segment 13 focus the waists of input beams on the connection line 26 between the third and fourth segments 13 and 14.

The "segmented plot" in FIG. 3 illustrates much smaller insertion losses for a 16×16 switch according to the present invention compared with the insertion losses for a conventional "unsegmented" 16×16 switch. This difference is not just based on reducing the overall optical path lengths, but on reducing the variance in the optical path lengths, i.e. eliminating the long and the short optical path lengths.

Figure 4:
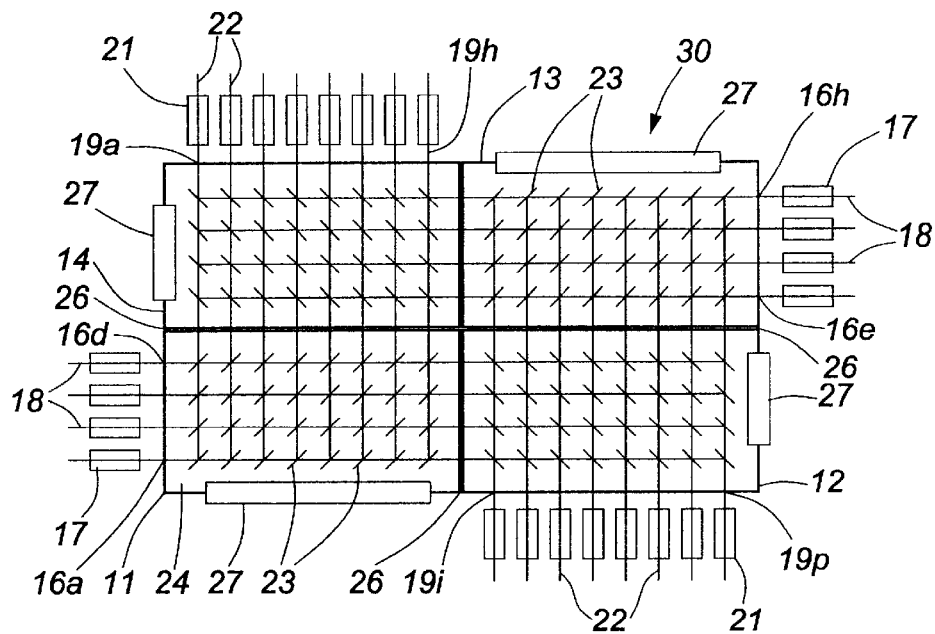
FIG. 4 is a schematic plan view of a second embodiment of an optical switch according to the present invention.
Figure 5:
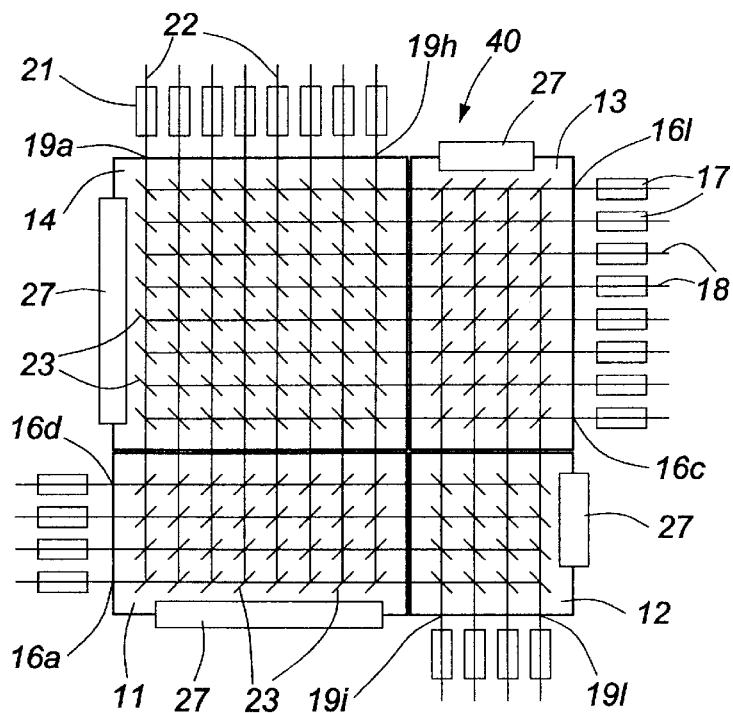
FIG. 5 is a schematic plan view of a third embodiment of an optical switch according to the present invention.

FIGS. 4 and 5 illustrate alternate embodiments of the switch of the present invention comprising four segments, which are not all identical. Switch 30 of FIG. 4 has all the same elements as switch 10, but includes only 8 input ports 16a to 16h, equally divided between first and third segments 11 and 13. In this case, the first segment 11 is identical to the third segment 13, and the second segment 12 is identical to the fourth segment 14. Each segment includes a 4×8 array of mirrors 23.

Similarly, switch 40 of FIG. 5 includes all the same elements as switches 10 and 30, except that the input ports 16a to 16l are not equally divided between first and third segments 11 and 13, and output ports 19a to 19l are not equally divided between second and fourth segments 12 and 14. Consequently, the first segment 11 includes a 4×8 array of mirrors 23, the second segment 12 includes a 4×4 array of mirrors 23, the third segment 13 includes a 8×4 array of mirrors 23, and the fourth segment 14 includes a 8×8 array of mirrors 23.

The switches 30 and 40 do not represent an optimum construction, since the variance in optical path lengths has not been minimized. Moreover, the switch can not be manufactured out of four identical segments. However, any segmentation according to the present invention will reduce the variance in the optical path lengths, and accordingly the insertion loss.

We claim:

1. A segmented optical switch comprising:
    a first segment including P substantially aligned input ports for launching beams of light into the switch;
    a second segment, directly connected to said first segment, including X substantially aligned output ports for receiving beams of light from the switch;
    a third segment, directly connected to said second segment, including Q substantially aligned input ports for launching beams of light into the switch; and
    a fourth segment, directly connected to said first and third segments, including Y substantially aligned output ports for receiving beams of light from the switch;
    wherein the first segment also includes P×Y reflecting means for redirecting the beams of light from the P input ports to the Y output ports;
    wherein the second segment also includes P×X reflecting means for redirecting the beams of light from the P input ports to the X output ports;
    wherein the third segment also includes Q×X reflecting means for redirecting the beams of light from the Q input ports to the X output ports; and
    wherein the fourth segment also includes Q×Y reflecting means for redirecting the beams of light from the Q input ports to the Y output ports;
    wherein each input port and each output port comprises a collimating/focussing lens for both inputting and outputting beams of light;
    wherein the lenses of the first segment focus beam waists proximate a mid-way point of an average optical path length between the input ports of the first segment and the output ports of the second segment.
2. The switch according to claim 1, wherein X=Y.
3. The switch according to claim 1, wherein P=Q.
4. The switch according to claim 1, wherein P=X.
5. The switch according to claim 1, wherein each segment is made separately and held together along lines of connection.

6. The switch according to claim 1, wherein X=Y=P=Q.

7. The switch according to claim 6, wherein each lens has substantially the same focal length.

8. The switch according to claim 7, wherein the switch is constructed of four substantially identical segments joined along lines of connection.

9. The switch according to claim 1, wherein said reflecting means comprises an array of movable mirrors on a micro-electronic substrate.

10. A segmented optical switch comprising:

a first segment including P substantially aligned input ports for launching beams of light into the switch;

a second segment, adjacent said first segment, including X substantially aligned output ports for receiving beams of light from the switch;

a third segment, adjacent said second segment, including Q substantially aligned input ports for launching beams of light into the switch; and a fourth segment, adjacent said first and third segments, including Y substantially aligned output ports for receiving beams of light from the switch;

wherein the first segment also includes P×Y reflecting means for redirecting the beams of light from the P input ports to the Y output ports;

wherein the second segment also includes P×X reflecting means for redirecting the beams of light from the P input ports to the X output ports;

wherein the third segment also includes Q×X reflecting means for redirecting the beams of light from the Q input ports to the X output ports; and wherein the fourth segment also includes Q×Y reflecting means for redirecting the beams of light from the Q input ports to the Y output ports;

wherein X=Y=P=Q;

wherein the switch is constructed of four substantially identical segments joined along lines of connection;

wherein each input port and each output port comprises a collimating/focussing lens for both inputting and outputting beams of light;

wherein each lens has substantially the same focal length; and wherein the lenses of one of the segments focus beam waists on the line of connection between the one segment and the next adjacent segment.

* * * * *